(12) United States Patent
Buxbaum et al.

(10) Patent No.: US 10,452,509 B2
(45) Date of Patent: *Oct. 22, 2019

(54) DYNAMIC COMPONENT PERFORMANCE MONITORING

(71) Applicant: Ab Initio Technology LLC, Lexington, MA (US)

(72) Inventors: Mark Buxbaum, Acton, MA (US); Michael G. Mulligan, Lexington, MA (US); Tim Wakeling, Andover, MA (US); Matthew Darcy Atterbury, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,822

(22) Filed: Sep. 21, 2018

(65) Prior Publication Data

US 2019/0026210 A1    Jan. 24, 2019

Related U.S. Application Data

(63) Continuation of application No. 13/678,928, filed on Nov. 16, 2012, now Pat. No. 10,108,521.

(51) Int. Cl.
*G06F 11/30* (2006.01)
*G06Q 30/02* (2012.01)
*G06Q 40/06* (2012.01)
*G06F 16/2455* (2019.01)
*G06F 11/34* (2006.01)

(52) U.S. Cl.
CPC ...... *G06F 11/3082* (2013.01); *G06F 11/3003* (2013.01); *G06F 11/3041* (2013.01); *G06F 11/3409* (2013.01); *G06F 16/24568* (2019.01); *G06Q 30/0201* (2013.01); *G06Q 40/06* (2013.01); *G06F 11/3452* (2013.01); *G06F 2201/865* (2013.01)

(58) Field of Classification Search
CPC ............ G06F 11/3409; G06F 11/3452; G06F 16/24568; G06F 2201/865; G06F 11/3041; G06F 11/3003; G06F 11/3082; G06Q 30/0201; G06Q 40/06
See application file for complete search history.

(56) References Cited

U.S. PATENT DOCUMENTS

| | | | | |
|---|---|---|---|---|
| 2011/0307897 A1* | 12/2011 | Atterbury | ........... | G06F 9/44521 718/102 |
| 2012/0222017 A1* | 8/2012 | Hinkle | .................... | G06F 11/30 717/130 |
| 2013/0124392 A1* | 5/2013 | Achanta | ................. | G06Q 40/00 705/38 |

* cited by examiner

*Primary Examiner* — Jacob D Dascomb
(74) *Attorney, Agent, or Firm* — Fish & Richardson P.C.

(57) ABSTRACT

Methods, systems, and apparatus, including computer programs encoded on computer storage media, for dynamic graph performance monitoring. One of the methods includes receiving input data by the data processing system, the input data provided by an application executing on the data processing system. The method includes determining a characteristic of the input data. The method includes identifying, by the application, a dynamic component from multiple available dynamic components based on the determined characteristic, the multiple available dynamic components being stored in a data storage system. The method includes processing the input data using the identified dynamic component. The method also includes determining one or more performance metrics associated with the processing.

12 Claims, 10 Drawing Sheets

DYNAMIC COMPONENT PERFORMANCE MONITORING

CLAIM OF PRIORITY

This application is a continuation of and claims priority to U.S. patent application Ser. No. 13/678,928 filed Nov. 16, 2012, the entire contents of which are incorporated herein by reference.

BACKGROUND

This description relates to monitoring performance metrics of dynamic graphs and other dynamic computing structures.

Computations can often be expressed as a data flow through a directed graph (called a "dataflow graph"), with components of the computation being associated with the vertices of the graph and data flows between the components corresponding to links (arcs, edges) of the graph. In a physical implementation of a system for executing such computations, data processing elements such as microprocessors executing suitable program instructions can be used to instantiate the component and data flow. The components can include data processing components that receive data at one or more input ports, process the data, and provide data from one or more output ports, and dataset components that act as a source or sink of the data flows. The components can also include one or more data graphs which can be loaded dynamically as data is executed in, for example, "dynamic components" or "micrographs". A system that implements such graph-based computations is described in U.S. Pat. No. 5,966,072, "Executing Computations Expressed as Graphs" and a system for implementing dynamic components in such graph based computations, is illustrated, for example, in U.S. patent application Ser. No. 13/161,010, "Dynamically Loading Graph-Based Computations."

SUMMARY

In one aspect, in general, a method for processing data includes receiving input data by the data processing system, the input data provided by an application executing on the data processing system. The method includes determining a characteristic of the input data. The method includes identifying, by the application, a dynamic component from multiple available dynamic components based on the determined characteristic, the multiple available dynamic components being stored in a data storage system. The method includes processing the input data using the identified dynamic component. The method also includes determining one or more performance metrics associated with the processing.

In one aspect, in general, a method for processing data includes receiving multiple units of work that each include one or more work elements. The method includes determining a characteristic of the first unit of work. The method includes identifying, by a component of the first dataflow graph, a second dataflow graph from multiple available dataflow graphs based on the determined characteristic, the multiple available dataflow graphs being stored in a data storage system. The method includes processing the first unit of work using the second dataflow graph. The method includes determining one or more performance metrics associated with the processing.

Aspects can include one or more of the following features. The second dataflow graph may be compiled independently of the first dataflow graph. The methods may include storing the one or more performance metrics in an in-memory data store. The methods may include transferring the stored one or more performance metrics to a persistent data store. The methods may include aggregating the one or more performance metrics with previously obtained performance metrics. Aggregating the one or more performance metrics may include aggregating the one or more performance metrics based on an identifier associated with the second dataflow graph. Aggregating the one or more performance metrics may include aggregating the one or more performance metrics based on an identifier associated with the first dataflow graph. The methods may include displaying the one or more performance metrics to a user.

Aspects can include one or more of the following advantages. Performance metrics for dynamic components may be collected and reported. The latency introduced by monitoring the performance of dynamic performance may be reduced.

Other features and advantages of the invention will become apparent from the following description, and from the claims.

DESCRIPTION

Dataflow graph systems are used where large volumes of data must be processed very fast. Monitoring the performance of a dataflow graph system enables users to identify components, individually or as a group, of the dataflow graph that can be improved or that may be performing improperly. For example, performance monitoring can enable a user to identify components that use excessive amounts of processor time, introduce latency delays, or are prone to failure. These components can be examined and modified in order to correct these deficiencies.

Dynamically loaded components (components which are selected and loaded at the time the dataflow graph executes) enhance the functionality of a dataflow graph by enabling new functionality to be introduced without re-compiling an existing graph. However, monitoring dynamically loaded components introduces additional complications.

In general, the creator of the dataflow graph may be unaware of the characteristics of subsequently introduced dynamic components, making such components difficult to monitor. Traditionally, a dataflow graph is unable to appropriately report the performance characteristics of these dynamic components.

At the same time, dynamic components are more likely to introduce performance problems. For example, the creator of a dynamic component may not be aware of nuances in the construction of the dataflow graph into which the component will be loaded. Therefore, the dynamic component may perform unnecessary operations or may adversely affect the processing or performance of the remainder of the dataflow graph.

By expanding the monitoring capabilities of dataflow graphs to account for dynamic components, the ability to monitor dataflow graph systems is improved.

Figure 1:
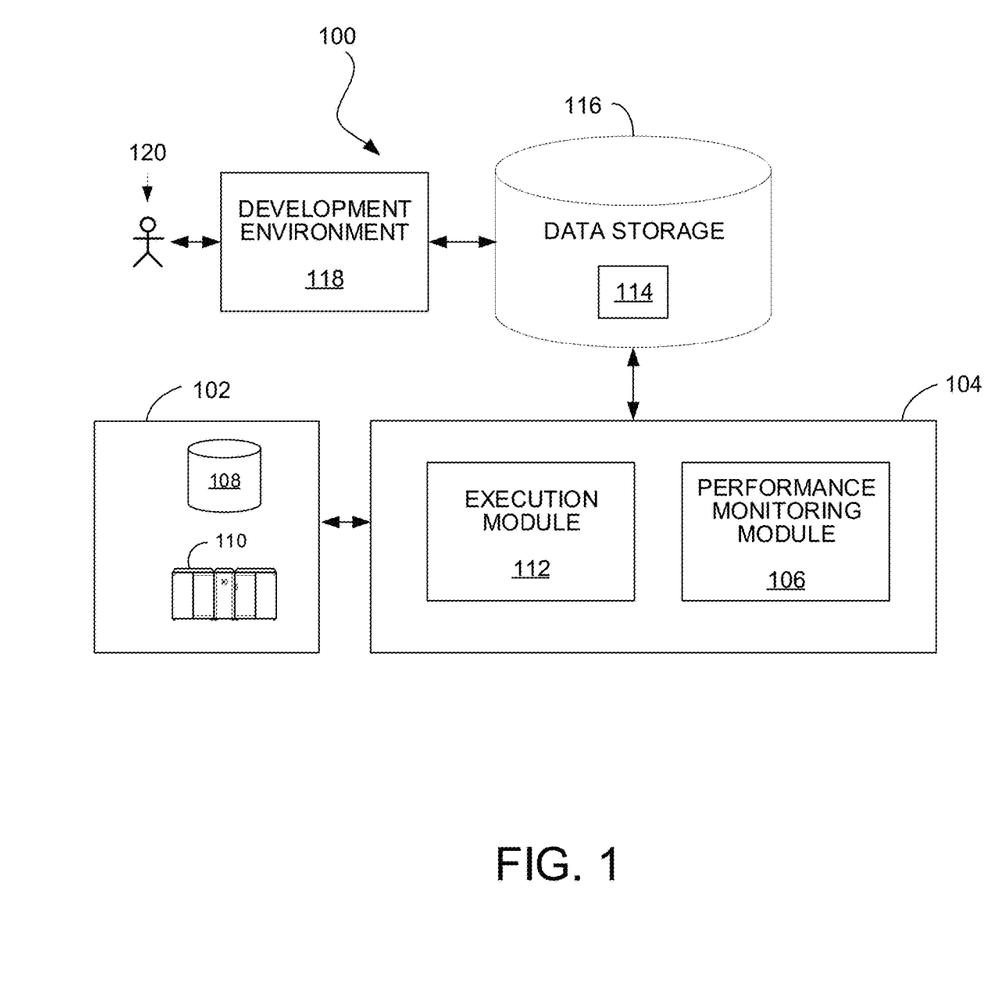
FIG. 1 is a block diagram of a system for executing graph-based computations.

FIG. 1 shows an exemplary data processing system 100 in which performance monitoring techniques can be used. The system 100 includes a data source 102 that may include one or more sources of data, such as storage devices or connections to online data streams, each of which may store data in any of a variety of storage formats (e.g., database tables, spreadsheet files, flat text files, or a native format used by a mainframe). An execution environment 104 includes a performance monitoring module 106 and an execution module 112. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs) (or, equivalently CPU "cores"), either local (e.g., multiprocessor systems such as symmetric multiprocessing (SMP) computers), or locally distributed (e.g., multiple processors coupled as clusters or massively parallel processing (MPPs), or remote, or remotely distributed (e.g., multiple processors coupled via one or more local area networks (LANs) and/or wide-area networks (WANs)), or any combination thereof.

The execution module 112 reads data from the data source 102. Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104, over a remote connection.

The execution module 112 uses the data from the data source 102 to generate output records 114 stored in a data storage system 116 accessible to the execution environment 104. The data storage system 116 is also accessible to a development environment 118. The development environment 118 is, in some implementations, a system for developing applications as dataflow graphs that include vertices (representing components or datasets) connected by directed links (representing flows of work elements) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, "Executing Computations Expressed as Graphs", incorporated herein by reference. As used herein, the terms "graph" and "micrograph" refer to a set of instructions and in association with a processor executing those instructions. Dataflow graphs made in accordance with this system provide mechanisms for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets or shared memory to pass data between the processes).

The execution module 112 can receive data from a variety of types of systems including different forms of database systems. The data may be organized as records having values for respective fields (also called "attributes" or "columns"), including possibly null values. When first reading data from a data source, the execution module 112 typically starts with some initial format information about records in that data source. In some circumstances, the record structure of the data source may not be known initially and may instead be determined after analysis of the data source. The initial information about records can include the number of bits that represent a distinct value, the order of fields within a record, and the type of value (e.g., string, signed/unsigned integer) represented by the bits.

Figure 2:
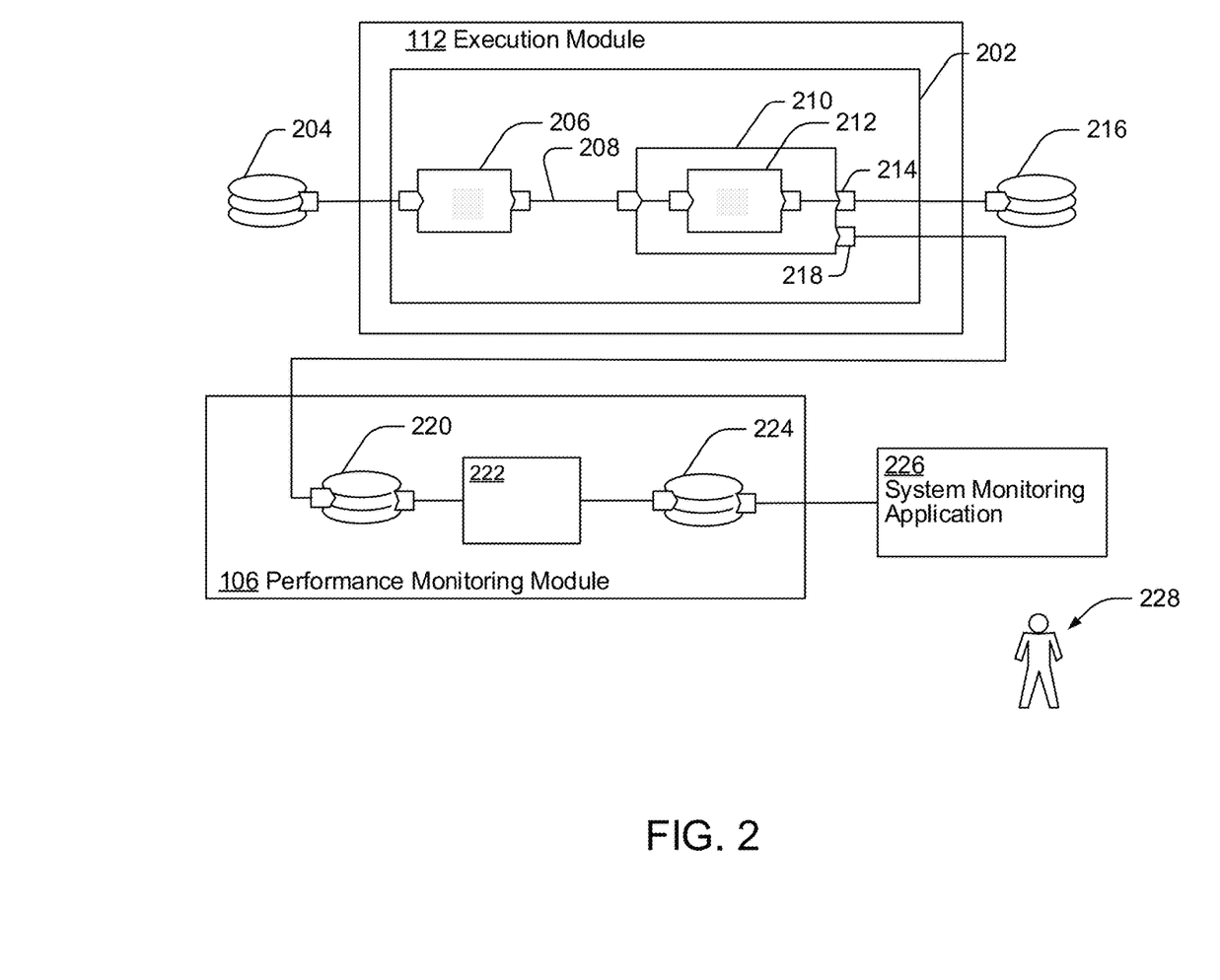
FIG. 2 shows an exemplary environment in which performance metrics for micrographs may be collected.

The performance monitoring module 106 collects performance metrics about the performance of the execution module 112. As discussed below, these metrics may include, for example, some or all of the number of records read, the number of bytes read, the number of records written, the number of bytes written, the processor time used, and the elapsed time. FIG. 2 shows an exemplary environment for collecting performance metrics of micrographs executed by an execution module. In general, a micrograph is a specialized sub-graph configured to be retrieved dynamically and embedded within the run-micrograph component 210. A system for executing such dynamically loaded graphs is described in U.S. patent application Ser. No. 13/161,010, "Dynamically Loading Graph-Based Computations", incorporated herein by reference. In some implementations, the micrograph may be precompiled.

The execution module 112 executes a graph 202. The execution module may be, for example, a process or set of processes being executed by a computer system. The graph may be a set of computer readable instructions which can be stored in a non-transitory computer readable storage device, such as the data storage 116. The graph 202 may be loaded from a data store, for example, the data storage 116 of FIG. 1.

In this example, the graph 202 includes a component 206 which reads data from a data source 204. The component 206 is connected to a run-micrograph component 210 by a link 208. Data records from the output port of the component 206 are passed into the input port of the run-micrograph component 210. In general, a port refers to any mechanism by which a component of a dataflow graph may receive or provide data. A port may be, for example, a Transmission Control Protocol (TCP)/Internet Protocol (IP) port, a network socket, or a software pipe. A port may also refer to other methods of communication between components such as, for example, reading and writing to shared memory.

The run-micrograph component 210 selects a micrograph 212 to execute. For example, a credit processing system may perform numerous actions on behalf of different users. The actions may include changing an address, raising a credit limit, and canceling a credit card. Each of these activities may be associated with a different code stored in a data record. A series of data records may include, for example, a first change of address from a first user, a second change of address from a second user, a cancel credit card request from a third user, a third change of address from a fourth user, and a raise credit limit request from a fifth user.

To process each of these records, one or more different micrographs 212 may be selected. For example, a change of address may be processed by a change of address micrograph, a cancel credit card may be processed by a cancel credit card micrograph, and a raise credit limit may be process by a raise credit limit micrograph. The micrographs may be stored in a data store and loaded dynamically at run-time. In some implementations, the micrographs may be pre-compiled dataflow graphs which are accessed by the run-micrograph component.

The run-micrograph component can produce output records on output port 214 and the output records can be stored in a data store 216.

The run-micrograph component 210 may monitor and record the performance characteristics of the micrograph 212. For example, the run-micrograph component 210 may collect performance metrics such as processor time used, elapsed time, number of bytes read, number of records read, number of bytes written, number of records written, number of executions, number of failed executions, total duration, average record processing rate (records/second), average byte processing rate (bytes/second), etc.

The performance metrics may be produced on a second output port 218 of the run-micrograph component 210. For example, the performance metrics may be one or more records that contain information about the performance of the selected micrograph 212 along with other selected micrographs.

The performance metrics can be stored in a data store 220 in the performance monitoring module 106. In some implementations, the data store 220 is selected to minimize the performance impact of writing the performance metrics. For example, it can be advantageous to reduce latency introduced by writing the performance metrics to the data store 220. In some implementations, the data store 220 may be located in shared memory 220. Operations which write to shared (e.g., semi-conductor) memory generally introduce less overhead and are consequently faster than similar operations writing to a persistent data store, such as a magnetic disk.

Periodically, for example, every five minutes, ten minutes, or thirty minutes, a transfer component 222 reads the performance metrics from the data store 220 and writes the performance metrics to a system monitoring log 224. In some implementations, the systems monitoring log can be located in a persistent data store.

A system monitoring component 226 can read the performance metrics from the data store 220 and can further process and aggregate the data. For example, the system monitoring application may combine the performance metrics associated with multiple dataflow graphs that together make up a single business transaction. The system monitoring application can present the performance metrics to a user 228. In general, each data record that is received by the run-micrograph component 210 may result in the loading and processing of a different micrograph, though a same micrograph may be used to process multiple data records.

Figure 3:
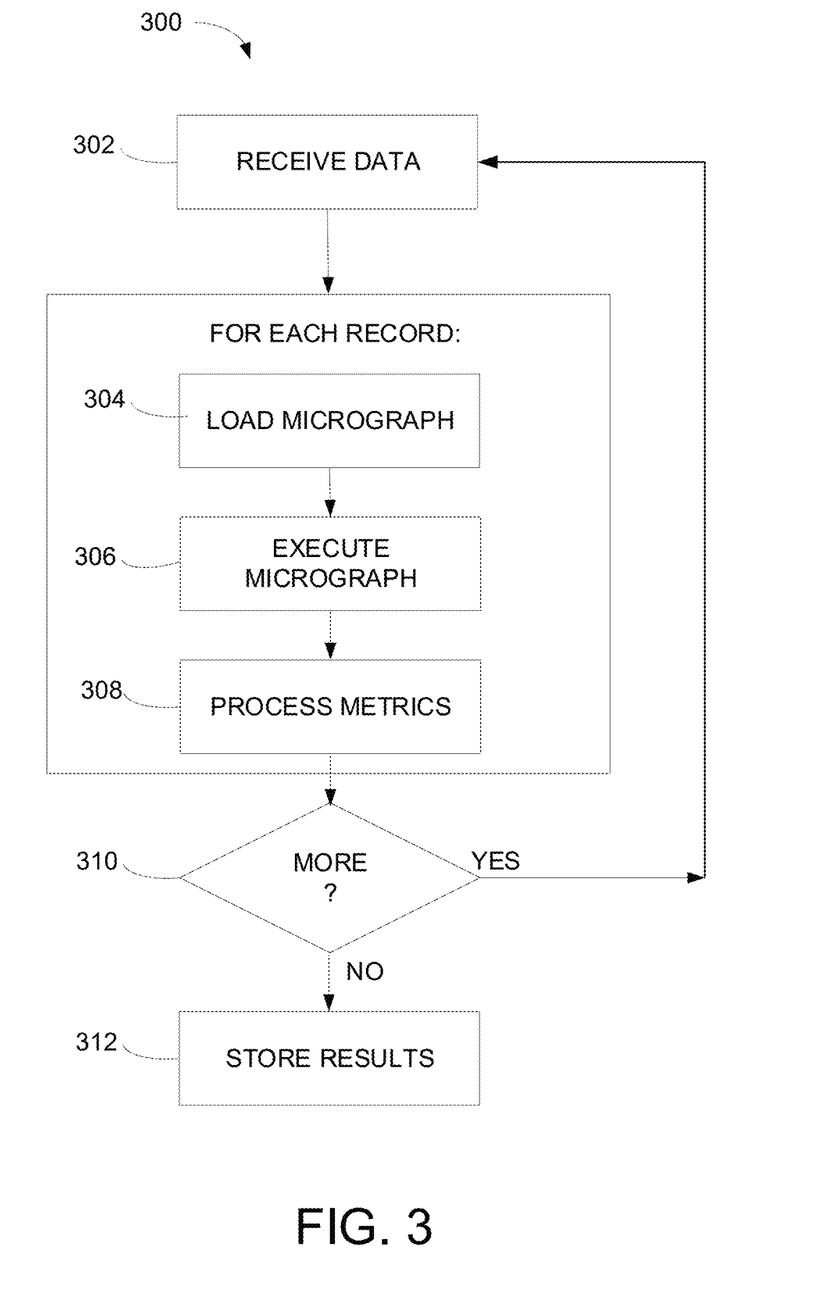
FIG. 3 is a flow chart for collecting performance metrics from a micrograph.

FIG. 3 is a flow chart for a process that collects performance metrics from micrographs that are loaded based on the contents of a data record. The process may be executed by an execution module, for example, the execution module 112 of FIG. 1.

Data is received, 302, for example on an input port of a run-micrograph component. In general, the data may be in the form of one or more records. The records may include one or more values which may correspond to one or more fields. For example, a credit card transaction data record may include four groups of four integer values (e.g., "1234 1234 1234 1234") which correspond to an account identifier field.

For each record, a micrograph may be loaded, 304; the micrograph may be executed, 306; and the metrics may be processed, 308.

The micrograph may be loaded from one or more locations or devices, such as a persistent data store, or may be stored in memory. Loading the micrograph may include selecting an appropriate micrograph to load, for example, by evaluating data comprising some of the data in the record. Based on the evaluation of the data contained in the record, the micrograph may be selected from one or more micrographs. For example, a particular field or combination of fields may be determinative of which micrograph to load.

In general, data that is used in the selection of the micrograph is referred to as control data. In some implementations, control data may be provided to the run-micrograph component in a separate data record from the data to be processed. In other implementations, the control data may be integrated into each data record and may in some instances also include data to be processed.

Micrographs may be compiled and stored in a data store. In some arrangements, a micrograph is, or is derived from, a data flow graph that was previously compiled and stored in the data storage system. In some arrangements, a micrograph remains in an un-compiled form when loaded from the data store. The micrograph can be compiled independently of the dataflow graph that includes the run-micrograph component.

Executing the micrograph, 306, can include providing the data record to an input port of the micrograph and receiving an output record from the output port of micrograph. In some implementations, the micrograph may receive zero or more data records and produce zero or more output records.

Processing the metrics, 308, can include determining the performance metrics for the micrograph (for example, processor time, elapsed byte, bytes read, and bytes written). The metrics may be aggregated. That is, the metrics may be summed across one or more executions of the micrograph. For example, the performance metrics can be aggregated based on the name or other label associated with the micrograph. For example, the performance of all executions of the "cancel credit card" micrograph may be combined. Additionally, a number of times the micrograph is executed may be tracked. The performance metrics may be stored in an in-memory data store.

Whether there are more records to be processed is determined at 310. For example, a micrograph may process multiple input records to produce a single output record. If the micrograph or the run-micrograph component requires additional records, the new records are received as data, 302. If no further records are required, then the output record is provided and stored, 312.

Performance metrics may be aggregated based on the run-micrograph component. That is, all executions for all micrographs by a particular run-micrograph component are aggregated. Performance metrics may also be aggregated, as described above, by a micrograph identifier. That is, all executions by a particular type of micrograph are aggregated. The micrograph identifier may be, for example, the name of the micrograph.

Performance metrics may also not be aggregated, but may be stored for each individual execution of a micrograph. In some implementations, the run-micrograph component may be configures to receive a user defined parameter which instructs how to aggregate the performance metrics.

Figure 4:
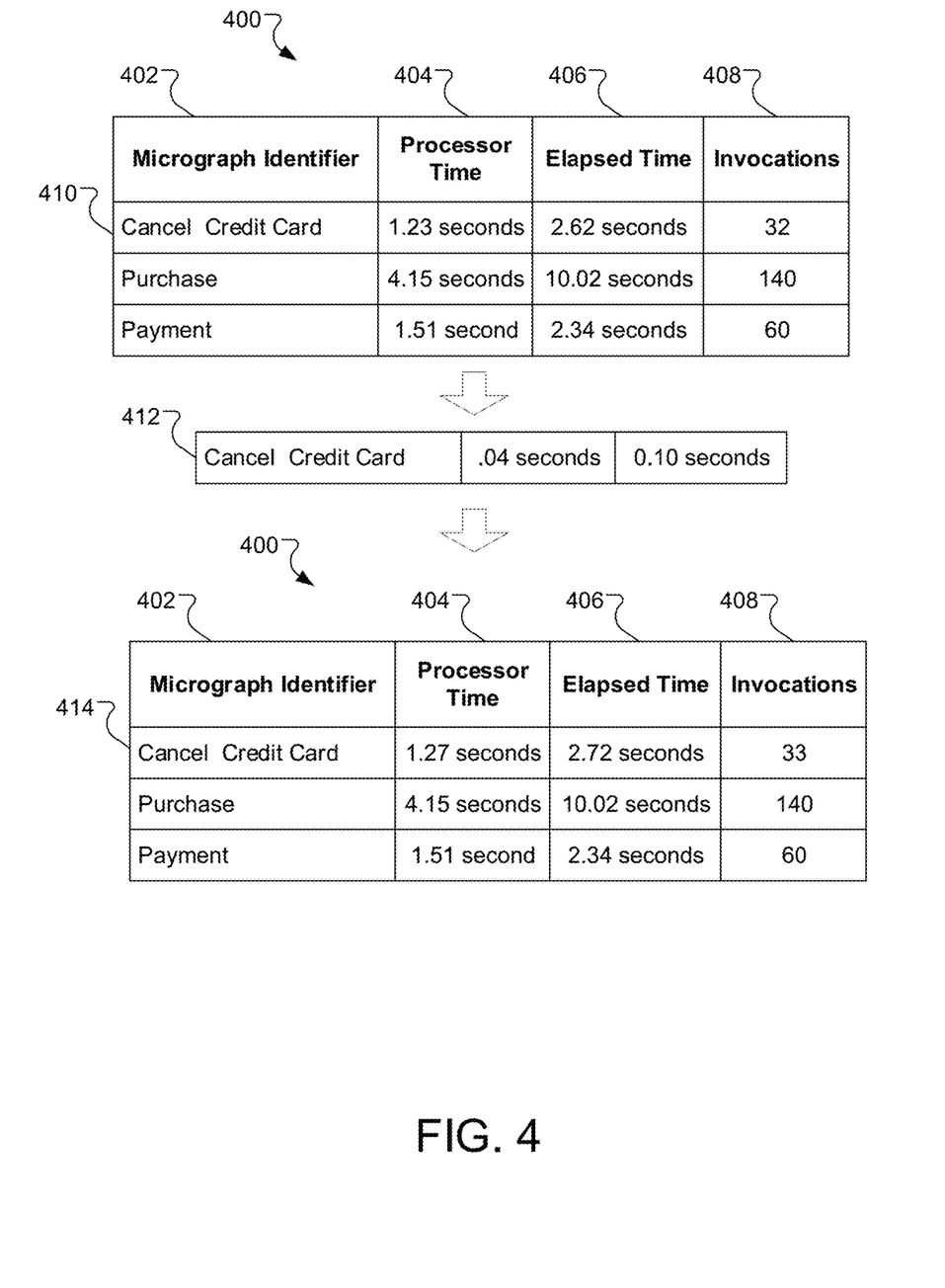
FIG. 4 illustrates an example of aggregating performance metrics by micrograph identifier.

As discussed above, performance metrics collected during the execution of a micrograph may be aggregated as the metrics are collected. FIG. 4 illustrates an example of aggregating performance metrics by micrograph identifier. The aggregated performance metrics may be used by a system monitoring application and displayed to a user. The table 400 may be located in a data store, for example, the data store 220 of FIG. 2. In this example, the table includes a "Micrograph Identifier" column 402, a "Processor Time" column 404, an "Elapsed Time" column 406 and an "Invocations" column 408. Initially, the table includes rows for an identifier of a "Cancel Credit Card" micrograph, an identifier of a "Purchase" micrograph, and an identifier of a "Payment" micrograph.

When a run-micrograph component, for example, the run-micrograph component 210 of FIG. 2, executes a micrograph, the table 400 may be updated. In this example, the table 400 is updated based on a new invocation of the "Cancel Credit Card" micrograph, represented by data record 412. The new invocation includes 0.04 seconds of processor time and 0.10 seconds elapsed time.

The "Cancel Credit Card" row 410 is read from the table 400 and updated with the information from the new invocation. In this example, the cumulative performance metrics for the "Cancel Credit Card" micrograph include 1.23 seconds of processor time and 2.62 seconds of elapsed time over 32 invocations. After the new record is added, the updated cancel credit card row 414 includes 1.27 seconds of processor time (1.23 seconds+0.04 seconds) and 2.72 seconds of elapsed time over 33 invocations.

In this manner, performance metrics may be aggregated during the execution of the micrograph. Aggregating the performance metrics can have the benefit of minimizing the amount of memory overhead required to store and manage the table 400.

Aggregating performance metrics is further complicated because different instances of the same dataflow graph may be executed in parallel. For example, multiple different machines may be executing and collecting performance metrics for different instances of the same micrograph concurrently.

Figure 5:
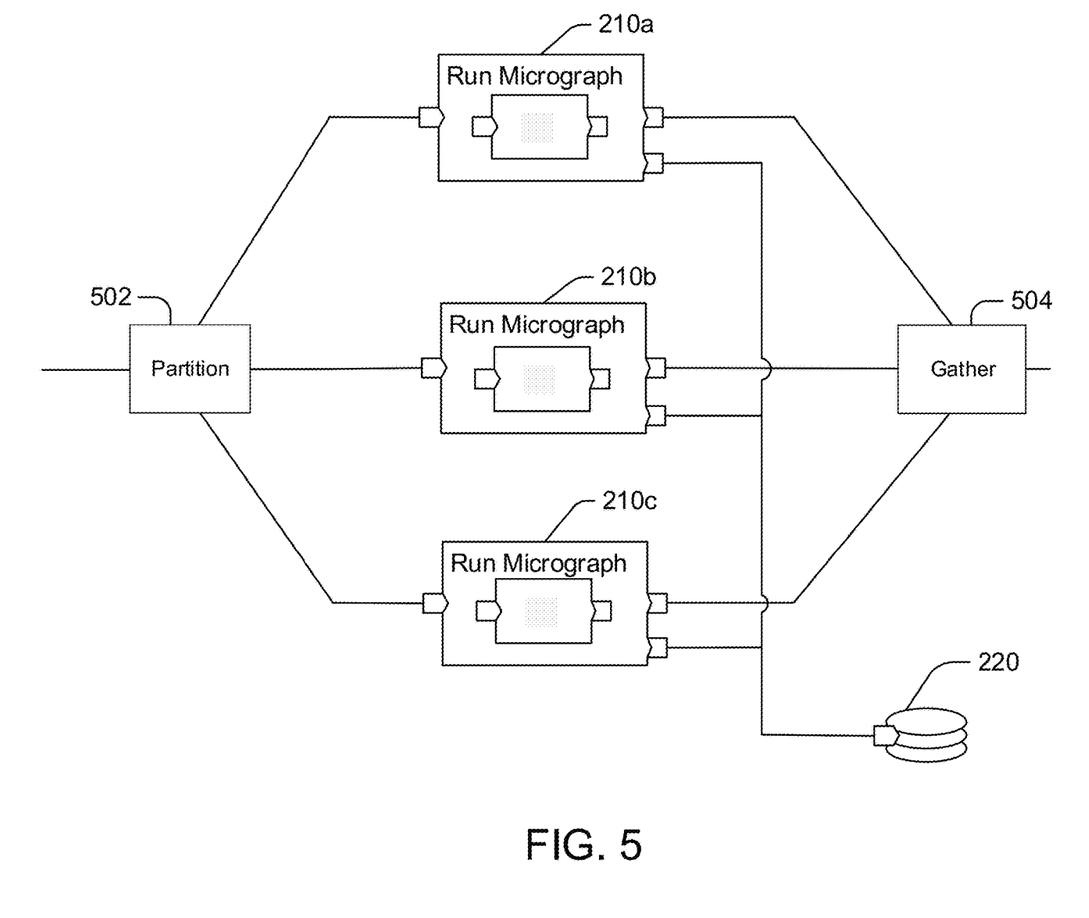
FIG. 5 illustrates an example environment in which run-micrograph components execute in parallel.

FIG. 5 illustrates an example environment in which run-micrograph components execute in parallel. Each instance of the run-micrograph component may be executed on one machine, a virtual machine, a processor, etc.

In this example, a partition element 502 divides a flow of input records between multiple instances of the run-micrograph component 210a, 210b, and 210c. Once the run-micrograph component processes an input record and produces an output record, the output records are collected by a gather element 504.

The performance metrics for each run-micrograph component may be delivered to the data store 220 and aggregated across each parallel instance, or may be stored separately for each parallel instance. In some implementations, the performance metrics for each parallel instance may be stored in a separate data store which is located on the same machine or device as the run-micrograph instance.

Figure 6:
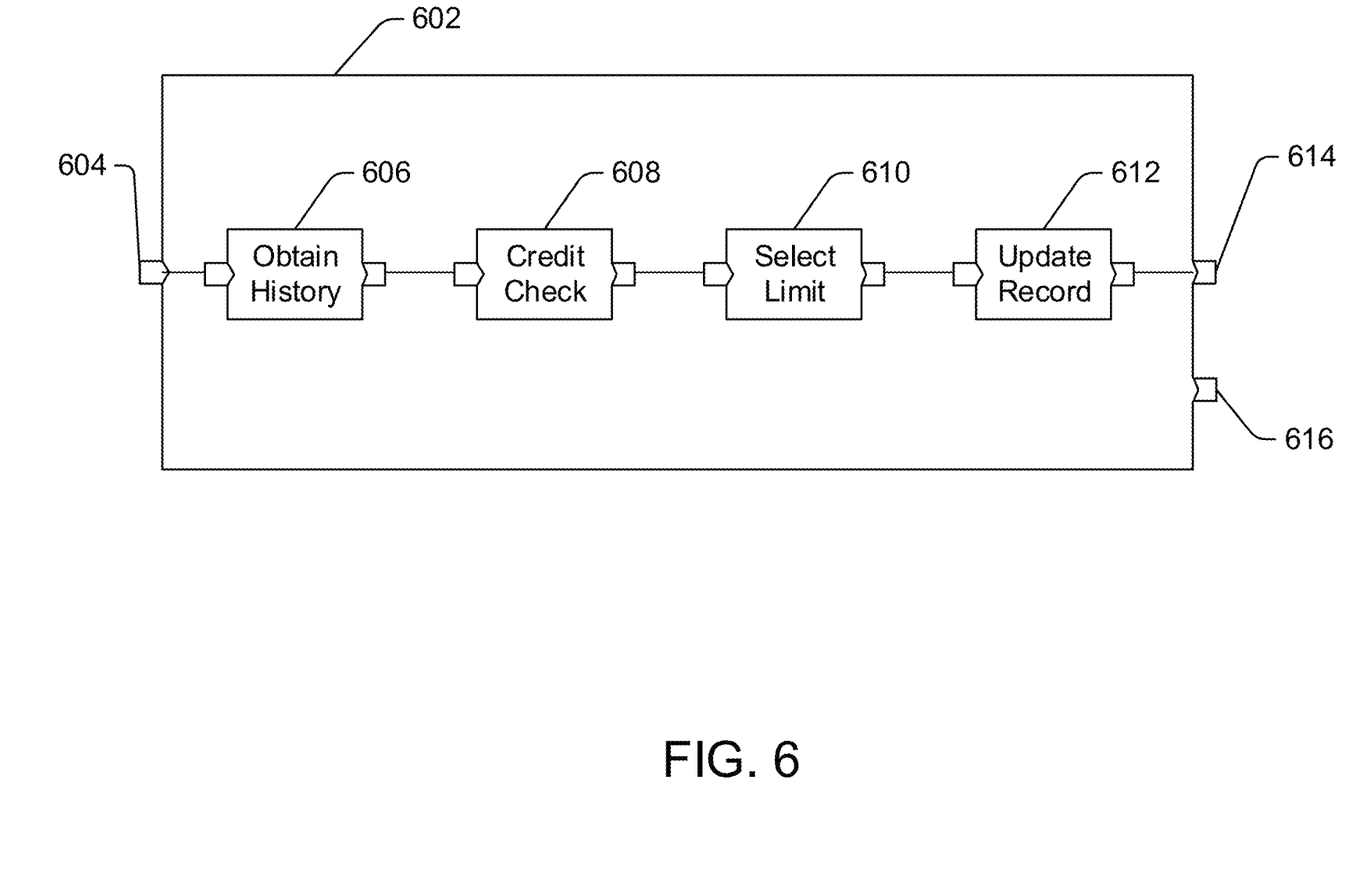
FIG. 6 illustrates an example of a micrograph for a "raise credit limit" transaction.

As a sub-graph, each micrograph may include multiple individual components that perform one or more distinct operations using a data record. In some implementations, micrographs may be instrumented to report additional information (e.g., more detailed information) about the performance of individual components of the micrograph. FIG. 6 illustrates an example of a micrograph for a "raise credit limit" transaction.

In this example, a "raise credit limit" micrograph 602 accepts input records on an input port 604. The "raise credit limit micrograph" 602 includes multiple components, such as an obtain history component 606 which obtains the payment history of a user requesting a credit limit increase; a credit check component 608 which checks the credit of the user; a select limit component 610 which selects a new credit limit based on the history and the credit check; and an update record component 612 which updates or creates an output record with the new credit limit. The output record is provided on an output port 614 of the micrograph 602.

The micrograph 602 may report the performance characteristics of its constituent components on a performance monitoring output port 616. For example, the "raise credit limit" micrograph 612 may report the processor time and elapsed time for the obtain history component 606, the credit check component 608, the select limit component 610 and the update record component 612. The run micrograph component (not shown) can collect and report these performance metrics based on an aggregation scheme as described above.

In some implementations, the run-micrograph component may request a list of the constituent components of the micrograph, for example, by sending a message through a dedicated input port (not shown). The run-micrograph component may provide the list of components on the performance monitoring output port 616. For example, in response to a request from the run-micrograph component (not shown) the "raise credit limit" micrograph may provide the comma-delimited list "obtain history, check credit, select limit, update record" on the performance metric port.

In some implementations, the run-micrograph component maintains a record of previously loaded micrographs. When a micrograph is loaded, the run-micrograph component may determine whether the micrograph has been previously loaded. If the micrograph has not been previously loaded, the run-micrograph component requests a list of the constituent components of the micrograph. The identity of the constituent components may be stored in the data store.

Once performance metrics are stored in a persistent data store, for example, the persistent data store 224 of FIG. 2 a performance monitoring application may access and use the stored performance metrics. In general, a performance monitoring application presents the collected metrics to a user in a manner that assists the user in understanding the metrics.

Figure 7:
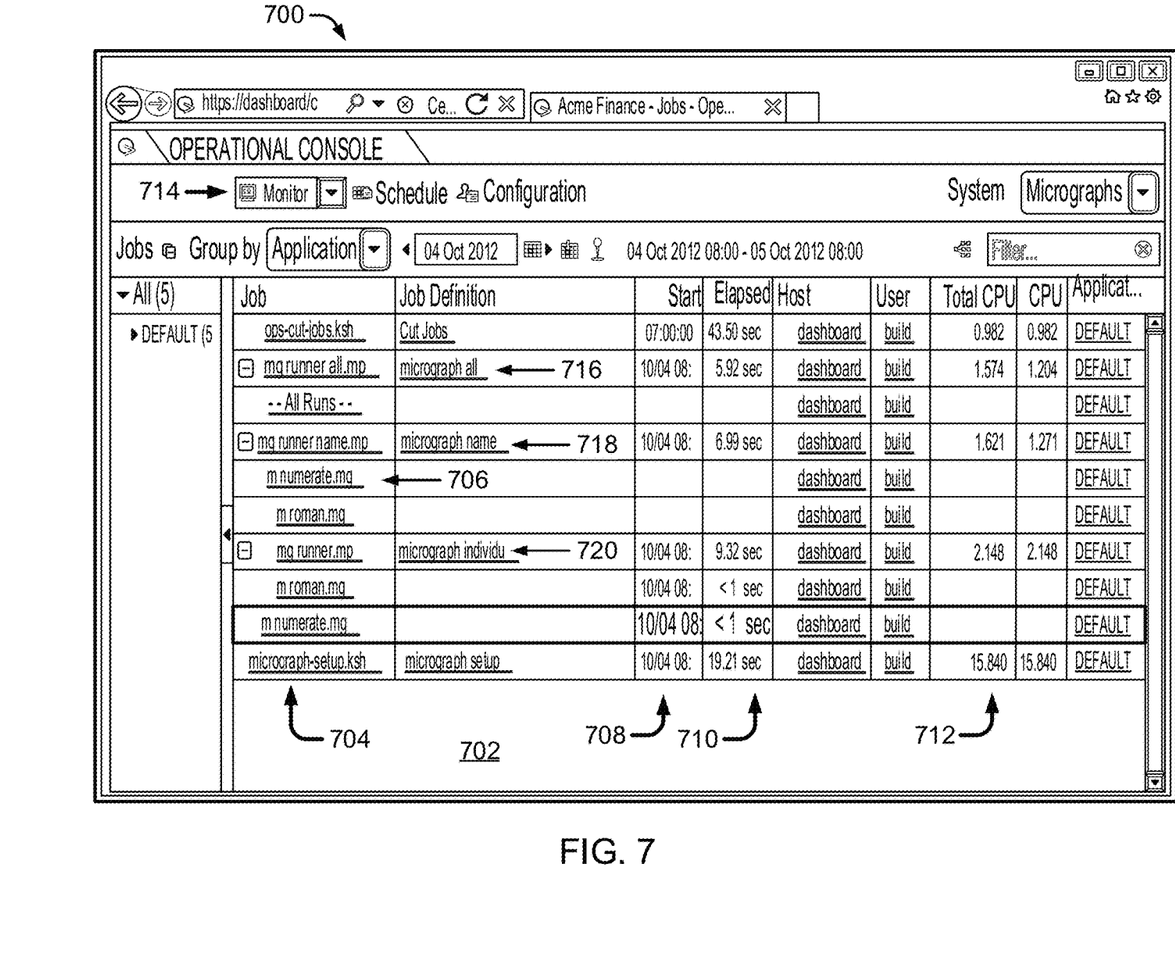
FIG. 7 illustrates an example user interface for the system monitoring application.

FIG. 7 illustrates an example user interface for a system for presenting collected performance metrics to a user. In this example, a user interface 700 presents a summary of data in a portion 702 of the user interface. The user interface 700 may be presented in one or more forms such as different types of network-based assets, for example, a web page displayed in a web browser on a user's computer system.

A monitor selector 714 enables a user to dynamically determine whether to monitor the execution of the micrographs. In some implementations, if a user elects not to monitor the execution of the micrograph, no performance metrics are collected. The monitor selector 714 may also allow the user to select how the performance metrics are aggregated. For example, the user may select to summarize the performance metrics for micrographs by micrograph name, to summarize the performance metrics across all micrographs, to store only the most recent execution of each micrograph, or to save the details of each execution of the micrograph.

In general, a job refers to processing a set of data records by one or more dataflow graphs. The performance metrics may be summarized differently for each job. For example, one micrograph 716 (titled "mg_runner_all.mp") is summarized across all micrograph executions. Another micrograph 718 (titled "mg_runner_name.mp") is summarized by its micrograph name. Still another micrograph 720 (titled "mg_runner.mp") records the performance metrics of each execution separately.

Performance metrics for each micrograph are obtained from the performance metrics stored in the persistent data store. For example, a start time 708 and elapsed time 710 are reported, as well as total processor time used 712.

Figure 8:
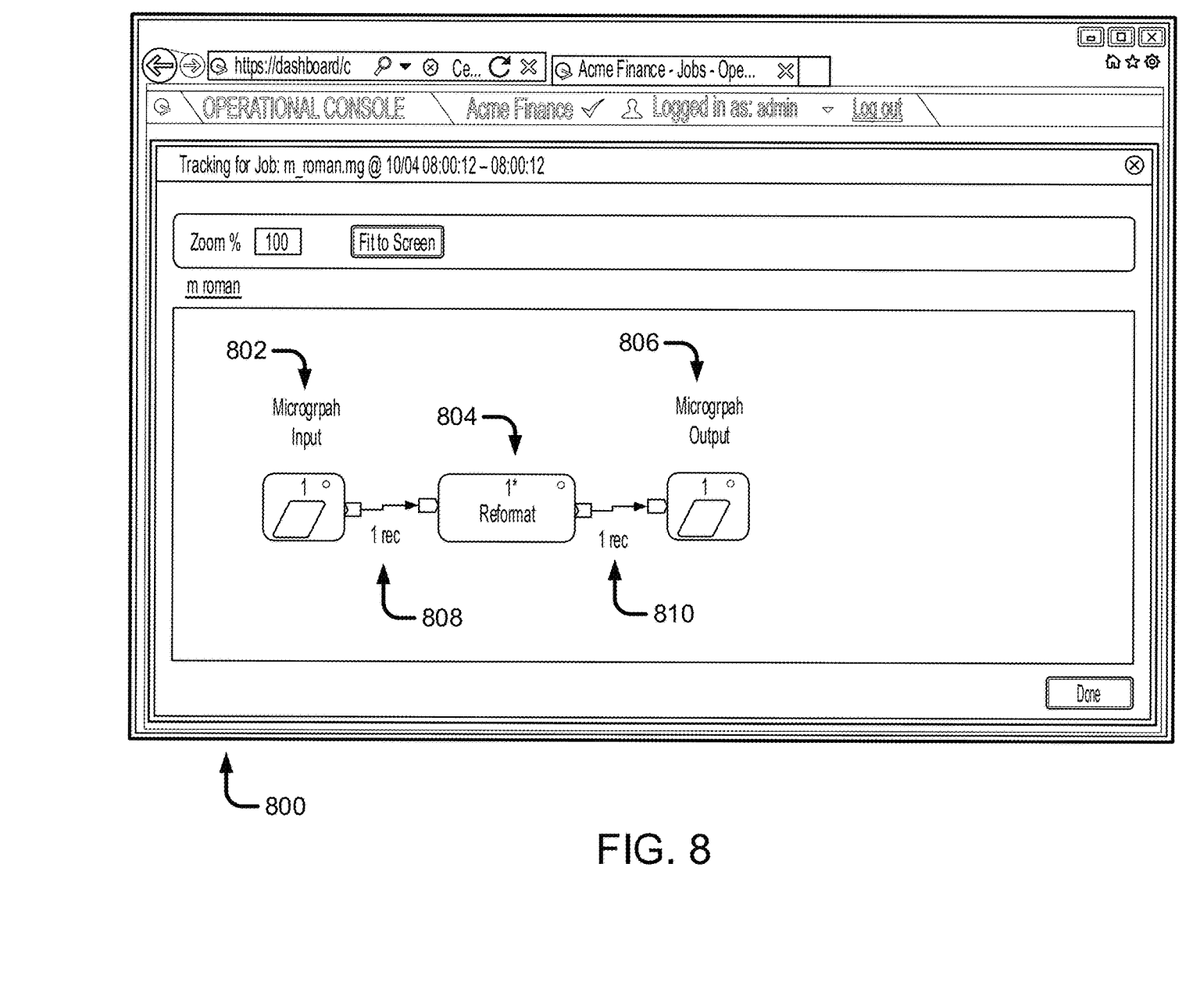
FIG. 8 illustrates an example user interface displaying a micrograph.

In some implementations, the user interface allows the user to expand and view the details of a particular job, micrograph, etc. FIG. 8 illustrates an example user interface 800 displaying a micrograph. In this example, a reformat micrograph 804 is displayed. An input port 802 for providing input records to the reformat micrograph 804 and an output port 806 for obtaining output records from the reformat micrograph 804 are also displayed.

Performance metrics are integrated into the user interface. In this example, the user interface displays that one record has been provided 808 to the micrograph and one record has been produced 810 by the micrograph.

Figure 9:
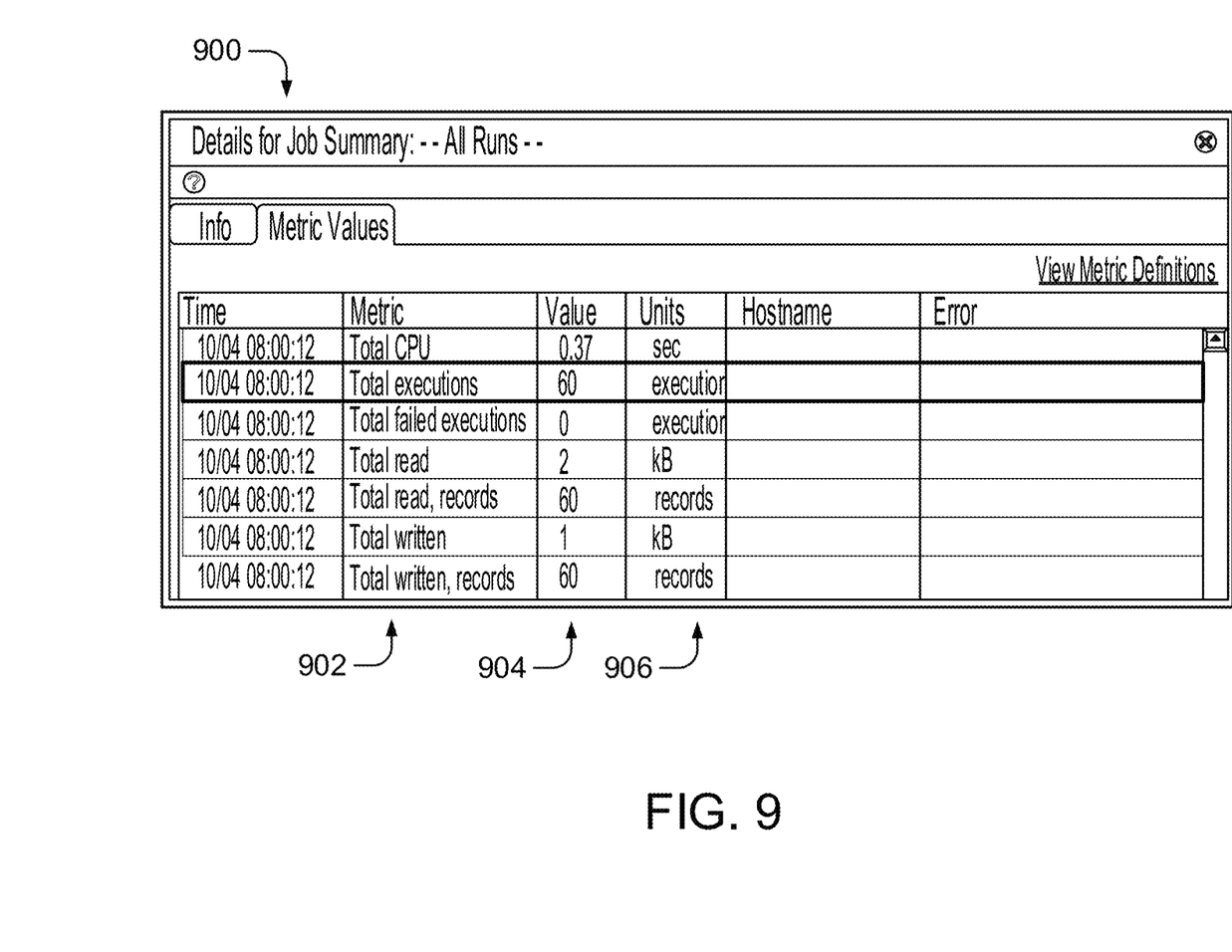
FIG. 9 illustrates an example user interface that displays additional performance metrics.

FIG. 9 illustrates an example user interface that displays additional performance metrics. The user interface 900 presents the aggregated performance metrics in tabular form. A metrics column 902 lists the name of the metrics and a value column 904 provides a corresponding value for the metrics. A units column 906 provides the units which define the values 904. Included in the list of metrics are the number of times the micrograph executed and how many times the micrograph failed to complete the execution successfully.

Figure 10:
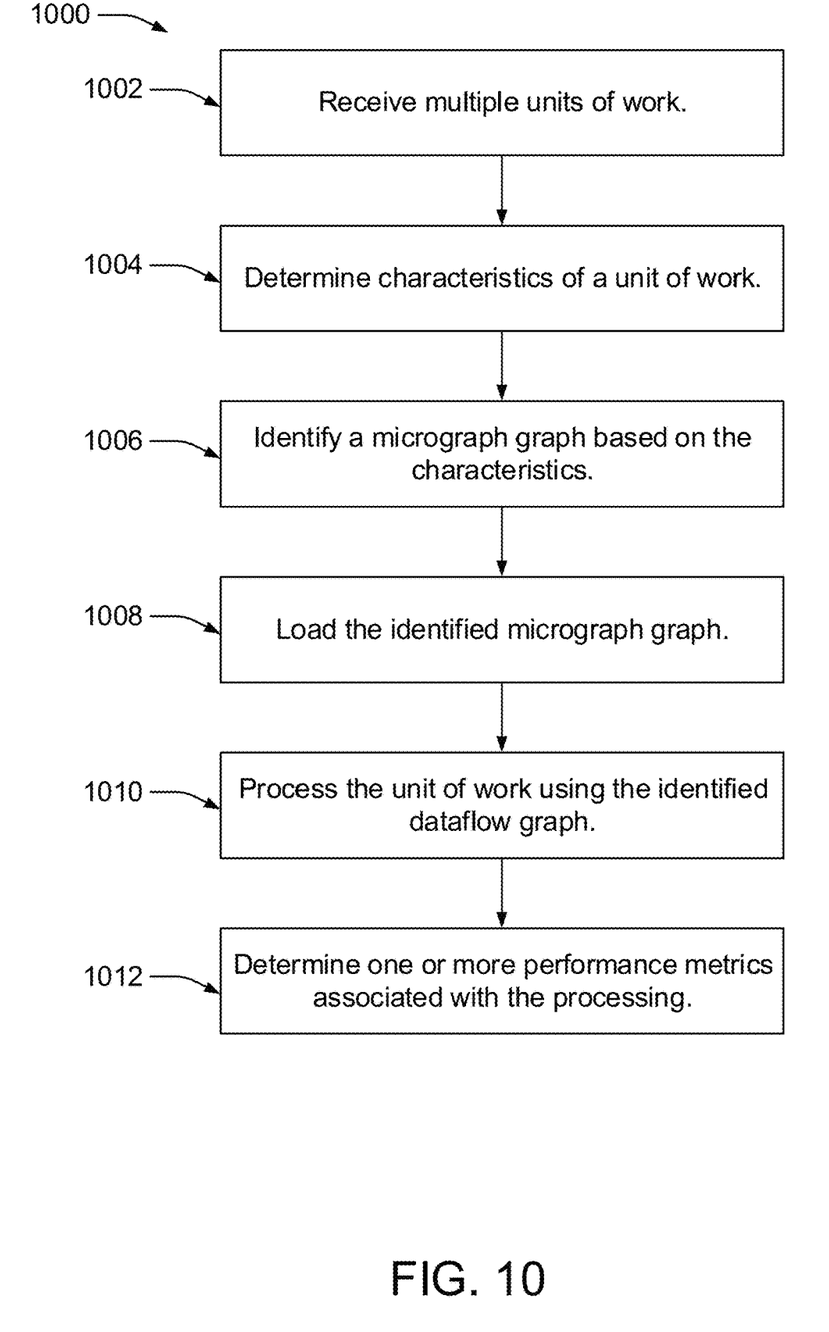
FIG. 10 is a flow chart for an example process for collecting performance metrics.

FIG. 10 is a flow chart of an example process for collecting performance metrics. The process 1000 may be performed by one or more computer systems including an execution module, for example, the execution module 104 of FIG. 1. For simplicity, the process will be described in relation to a system performing the process.

Multiple units of work are received, 1002. The units of work may be received by a component of a dataflow graph. A unit of work may include zero or more input data records. The input data records may be provided from a data store or from an output port of a preceding component in the dataflow graph.

Characteristics of a unit of work are determined, 1004. A characteristic may be one or more values stored in fields of one of the input data records. For example, a characteristic may be a value in a field which identifies an operation to be performed by the component of the dataflow graph.

A micrograph is identified based on the characteristics, 1006. For example, the process can identify a micrograph that performs the operation identified by the field. The micrograph may be identified by comparing the characteristics of the unit of work to a list of available micrographs, for example, by using a look up table, dictionary, or similar data structure.

The identified dataflow graph is loaded, 1008. A run-micrograph component may load the dataflow graph. The micrograph can be, for example, a data flow graph stored in a data store. The micrograph can be configured to be loaded and executed by a component of a data flow graph, for example, the run-micrograph component 222 of FIG. 2. In some arrangements, a micrograph remains in an un-compiled form when loaded from the data storage system. In some arrangements, the micrograph is serialized prior to being stored in the data storage system. In general, serialization is a process by which a dataflow graph, in a compiled or uncompiled form, is translated into a binary stream of zeroes and ones so that the dataflow graph is in a form that can easily be stored in a data store.

The unit of work is processed using the identified dataflow graph, 1010. In some implementations, the unit of work is provided on an input port of the identified micrograph. Generated output records, if any, are provided by an output port of the identified micrograph.

One or more performance metrics are determined, 1012. The performance metrics may be determined by a run-micrograph component or the micrograph may be instrumented to provide performance metrics on a specialized output port of the micrograph.

The techniques described herein can be used in other dynamic programming systems. For example, the techniques can be used in any system in which application components or software programs are loaded dynamically in response to input data. For example, an execution environment may dynamic load libraries in response to data driven requests. For example, in the Java programming language objects may be stored in archive files (referred to as .jar or JAR files). In other environments, software may be stored in dynamic libraries (for example, dynamic linked libraries, also knows as DLLs). The techniques described above can be used to monitor the performance of these dynamically loaded software components.

These techniques can also be used in data driven programming. In data driven programming the flow of control of executing computer application is determined by the input data. For example, instructions to control a robot or similar device may include the instructions "right, forward, forward, left, stop." Each of the instructions "right, "forward," "left" and "stop" may correspond to a different set of programming logic. In some implementations, the programming logic may be determined dynamically and it also may be extensible; for example, it may be stored in an updatable library on a secondary data store. In these scenarios, the performance of the stored programming logic may be monitored using the techniques described above.

Other examples of scenarios in which the techniques describe above can be useful include dynamic class loading. For example, in COM programming a library may be identified by a string (e.g. "microsoft.scripting"). The performance metrics of the access of the library (e.g. function calls, methods, etc.) may be determined based on the described monitoring techniques.

The performance monitoring approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, the software may provide other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a tangible, non-transitory storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. It is to be understood that the foregoing description is intended to illustrate and not to limit the scope of the invention, which is defined by the scope of the appended claims. It will be understood that various modifications may be made without departing from the spirit and scope of the invention. For example, some of the steps described above may be order independent, and thus can be performed in an order different from that described. Other embodiments are within the scope of the following claims.

What is claimed is:

1. A method for processing data in a data processing system, the method including:
   receiving input data records by a first program executing on the data processing system, with the first program having an output port that outputs, to a data store, one or more performance metrics indicative of a performance of a dynamic program loaded into the first program;
   based on a characteristic of one or more input data records, identifying, by the first program executing on the data processing system, a dynamic program from multiple available dynamic programs stored in a data storage system;
   loading the dynamic program identified from the data storage system into the first program;
   processing, by at least the loaded dynamic program executing on the data processing system, the one or more input data records;
   outputting, by the output port of the first program executing on the data processing system, one or more performance metrics indicative of performance of processing the one or more input data records with the dynamic program identified based on the characteristic of the one or more input data records and loaded from the data storage system into the first program;
   writing the one or more performance metrics to the data store;
   selecting, from among a plurality of performance metrics that are written to the data store and that are indicative of performances of at least a plurality of the multiple available dynamic programs, one or more performance metrics associated with an identifier of the identified dynamic program loaded into the first program and one or more other performance metrics associated with the identifier of the identified dynamic program loaded into the first program or into a second program; and
   aggregating (i) the one or more performance metrics that are selected from the data store and that are indicative of performance of the processing of the one or more input data records with the dynamic program identified based on the characteristic of the one or more input data records and loaded from the data storage system into the first program, with (ii) the other one or more performance metrics that are selected from the data store and that are indicative of performance of processing one or more other input data records with the identified dynamic program that is loaded from the data storage system into the first program or into the second program.

2. The method of claim 1, wherein further including storing aggregated performance metrics in an in-memory data store.

3. The method of claim 1, further including transferring the output one or more performance metrics to a persistent data store.

4. The method of claim 1, further including generating data for a graphical user interface that when rendered on a display device displays the one or more performance metrics output, the selected one or more performance metrics or the aggregated performance metrics.

5. A data processing system for processing data, including:
   one or more processors; and
   one or more machine-readable hardware storage devices configured to store instructions that are executable by the one or more processors to perform operations including:
   receiving input data records by a first program executing on the data processing system, with the first program having an output port that outputs, to a data store, one or more performance metrics indicative of a performance of a dynamic program loaded into the first program;
   based on a characteristic of one or more input data records, identifying, by the first program executing on the data processing system, a dynamic program from multiple available dynamic programs stored in a data storage system;
   loading the dynamic program identified from the data storage system into the first program;
   processing, by at least the loaded dynamic program executing on the data processing system, the one or more input data records;
   outputting, by the output port of the first program executing on the data processing system, one or more performance metrics indicative of performance of processing the one or more input data records with the dynamic program identified based on the characteristic of the one or more input data records and loaded from the data storage system into the first program;
   writing the one or more performance metrics to the data store;
   selecting, from among a plurality of performance metrics that are written to the data store and that are indicative of performances of at least a plurality of the multiple available dynamic programs, one or more performance metrics associated with an identifier of the identified dynamic program loaded into the first program and one or more other performance metrics associated with the identifier of the identified dynamic program loaded into the first program or into a second program; and
   aggregating (i) the one or more performance metrics that are selected from the data store and that are indicative of performance of the processing of the one or more input data records with the dynamic program identified based on the characteristic of the one or more input data records and loaded from the data storage system into the first program, with (ii) the other one or more performance metrics that are selected from the data store and that are indicative of performance of processing one or more other input data records with the identified dynamic program that is loaded from the data storage system into the first program or into the second program.

6. The data processing system of claim 5, further including: an in-memory data store for storing aggregated performance metrics in the in-memory data store.

7. The data processing system of claim 5, wherein the operations further include transferring the output one or more performance metrics to a persistent data store.

8. The data processing system of claim 5, wherein the operations further include generating data for a graphical user interface that when rendered on a display device displays the one or more performance metrics output, the selected one or more performance metrics or the aggregated performance metrics.

9. One or more machine-readable hardware storage devices configured to store instructions that are executable by one or more processors to perform operations including:
  receiving input data records by a first program executing on the data processing system, with the first program having an output port that outputs, to a data store, one or more performance metrics indicative of a performance of a dynamic program loaded into the first program;
  based on a characteristic of one or more input data records, identifying, by the first program executing on the data processing system, a dynamic program from multiple available dynamic programs stored in a data storage system;
  loading the dynamic program identified from the data storage system into the first program;
  processing, by at least the loaded dynamic program executing on the data processing system, the one or more input data records;
  outputting, by the output port of the first program executing on the data processing system, one or more performance metrics indicative of performance of processing the one or more input data records with the dynamic program identified based on the characteristic of the one or more input data records and loaded from the data storage system into the first program;
  writing the one or more performance metrics to the data store;
  selecting, from among a plurality of performance metrics that are written to the data store and that are indicative of performances of at least a plurality of the multiple available dynamic programs, one or more performance metrics associated with an identifier of the identified dynamic program loaded into the first program and one or more other performance metrics associated with the identifier of the identified dynamic program loaded into the first program or into a second program; and
  aggregating (i) the one or more performance metrics that are selected from the data store and that are indicative of performance of the processing of the one or more input data records with the dynamic program identified based on the characteristic of the one or more input data records and loaded from the data storage system into the first program, with (ii) the other one or more performance metrics that are selected from the data store and that are indicative of performance of processing one or more other input data records with the identified dynamic program that is loaded from the data storage system into the first program or into the second program.

10. The one or more machine-readable hardware storage devices of claim 9, wherein the operations further include: storing aggregated performance metrics in an in-memory data store.

11. The one or more machine-readable hardware storage devices of claim 9, wherein the operations further include transferring the output one or more performance metrics to a persistent data store.

12. The one or more machine-readable hardware storage devices of claim 9, wherein the operations further include generating data for a graphical user interface that when rendered on a display device displays the one or more performance metrics output, the selected one or more performance metrics or the aggregated performance metrics.

* * * * *